United States Patent
Kim

(10) Patent No.: US 11,590,427 B1
(45) Date of Patent: Feb. 28, 2023

(54) SYSTEMS AND METHODS FOR TOURNAMENT-BASED TELEMATICS INSURANCE PRICING

(71) Applicant: BlueOwl, LLC, San Francisco, CA (US)

(72) Inventor: Michael Sungjun Kim, Fairfax, CA (US)

(73) Assignee: BlueOwl, LLC, San Francisco, CA (US)

( * ) Notice: Subject to any disclaimer, the term of this patent is extended or adjusted under 35 U.S.C. 154(b) by 64 days.

(21) Appl. No.: 16/824,047

(22) Filed: Mar. 19, 2020

(51) Int. Cl.
  A63F 13/79     (2014.01)
  A63F 13/35     (2014.01)
  G06F 16/29     (2019.01)
  B60W 40/09     (2012.01)
  G06Q 30/0207   (2023.01)

(52) U.S. Cl.
  CPC .............. *A63F 13/79* (2014.09); *A63F 13/35* (2014.09); *G06F 16/29* (2019.01); *B60W 40/09* (2013.01); *G06Q 30/0207* (2013.01); *G06Q 30/0209* (2013.01); *G06Q 30/0224* (2013.01)

(58) Field of Classification Search
  CPC .......... A63F 13/35; A63F 13/79; G06F 16/29; G06Q 30/0207; G06Q 30/0209; G06Q 30/0224; B60W 40/09
  See application file for complete search history.

(56) References Cited

U.S. PATENT DOCUMENTS

| | | | |
|---|---|---|---|
| 8,840,462 B2 | 9/2014 | Patel et al. | |
| 9,373,203 B1 * | 6/2016 | Fields | A61B 5/18 |
| 9,586,591 B1 * | 3/2017 | Fields | B60W 40/09 |
| 9,643,089 B2 * | 5/2017 | Ishikawa | A63F 13/65 |
| 9,754,425 B1 * | 9/2017 | Iqbal | B60W 40/09 |
| 9,892,573 B1 * | 2/2018 | Hsu-Hoffman | G06Q 30/0279 |
| 10,013,883 B2 * | 7/2018 | Farnham, IV | G08G 1/0129 |
| 10,127,570 B1 * | 11/2018 | Cote | G06Q 30/0207 |
| 10,181,238 B2 * | 1/2019 | Hate | G06Q 10/103 |
| 10,262,375 B1 * | 4/2019 | Howard | A63F 13/61 |
| 10,282,786 B1 * | 5/2019 | Osborne | G06Q 40/08 |
| 10,304,265 B1 | 5/2019 | Hsu-Hoffman et al. | |
| 10,360,576 B1 * | 7/2019 | Hsu-Hoffman | G07C 5/0841 |
| 10,430,745 B2 * | 10/2019 | Rani | G07C 5/0841 |

(Continued)

FOREIGN PATENT DOCUMENTS

SG    10201405120P A  *  8/2014

*Primary Examiner* — Steven J Hylinski
(74) *Attorney, Agent, or Firm* — Faegre Drinker Biddle & Reath LLP

(57) ABSTRACT

A computer system for creating driving tournaments for users including a processor in communication with a memory device is provided. The processor may be programmed to: i) receive user data associated with a plurality of users, ii) generate, based at least in part upon the received user data, a driving profile including driving characteristics of each user, iii) match users based at least in part upon the driving profiles of the users, wherein a match occurs when driving characteristics of the driving profiles are substantially similar, iv) create a driving tournament for the matched one or more users, v) receive current vehicle telematics data and current mobile device data associated with the matched one or more users, and vi) determine, after the predetermined time period has ended, a winner of the driving tournament.

20 Claims, 6 Drawing Sheets

(56) References Cited

U.S. PATENT DOCUMENTS

| | | | | |
|---|---|---|---|---|
| 10,445,758 B1* | 10/2019 | Bryer | | G06Q 40/08 |
| 10,617,938 B2* | 4/2020 | Chen | | A63F 13/60 |
| 10,672,249 B1* | 6/2020 | Balakrishnan | | G08B 21/06 |
| 10,703,378 B1* | 7/2020 | Russo | | G06F 16/248 |
| 10,759,441 B1* | 9/2020 | Balakrishnan | | H04L 67/22 |
| 10,885,539 B1* | 1/2021 | Purgatorio | | B60W 40/09 |
| 10,915,964 B1* | 2/2021 | Purgatorio | | G06Q 30/0226 |
| 2002/0178033 A1* | 11/2002 | Yoshioka | | G06Q 40/08 |
| | | | | 705/4 |
| 2007/0257804 A1* | 11/2007 | Gunderson | | G06Q 40/08 |
| | | | | 340/576 |
| 2010/0205012 A1* | 8/2010 | McClellan | | G07C 5/085 |
| | | | | 705/4 |
| 2011/0090075 A1* | 4/2011 | Armitage | | G09B 19/167 |
| | | | | 340/439 |
| 2012/0052953 A1* | 3/2012 | Annambhotla | | A63F 13/65 |
| | | | | 463/40 |
| 2012/0072241 A1* | 3/2012 | Krause | | G06Q 40/02 |
| | | | | 705/4 |
| 2012/0185282 A1* | 7/2012 | Gore | | G06Q 30/02 |
| | | | | 705/4 |
| 2013/0090821 A1* | 4/2013 | Abboud | | G07C 5/085 |
| | | | | 701/70 |
| 2013/0164715 A1* | 6/2013 | Hunt | | G01S 19/13 |
| | | | | 434/65 |
| 2013/0311250 A1* | 11/2013 | Hickethier | | G06Q 30/0207 |
| | | | | 705/14.1 |
| 2014/0113619 A1* | 4/2014 | Tibbitts | | G07C 5/0808 |
| | | | | 455/419 |
| 2014/0195272 A1* | 7/2014 | Sadiq | | G06Q 40/08 |
| | | | | 705/4 |
| 2014/0322676 A1* | 10/2014 | Raman | | G09B 19/167 |
| | | | | 434/65 |
| 2015/0081404 A1* | 3/2015 | Basir | | G06Q 30/0224 |
| | | | | 705/14.1 |
| 2015/0294422 A1* | 10/2015 | Carver | | G06Q 40/08 |
| | | | | 705/4 |
| 2017/0089710 A1* | 3/2017 | Slusar | | G01C 21/3461 |
| 2017/0323244 A1* | 11/2017 | Rani | | G06Q 10/06393 |
| 2019/0287180 A1* | 9/2019 | Vartanian | | G06F 16/252 |
| 2020/0357075 A1* | 11/2020 | Dahl | | G06Q 40/08 |
| 2021/0097314 A1* | 4/2021 | Scanlon | | G06T 7/97 |
| 2021/0142419 A1* | 5/2021 | Davis | | H04W 24/08 |

\* cited by examiner

SYSTEMS AND METHODS FOR TOURNAMENT-BASED TELEMATICS INSURANCE PRICING

FIELD OF THE DISCLOSURE

The present disclosure relates to generating tournaments for drivers (e.g., users of vehicles), and more specifically, to generating tournaments for improving driving characteristics of drivers based at least in part upon vehicle telematics data associated with the drivers.

BACKGROUND

The gamification of routine tasks can increase excitement and more purposeful execution of the tasks for people. Competitions and/or tournaments related to routine tasks can especially increase excitement due to the involvement of others. A tournament is, for example, a series of contests between a number of competitors, who compete for an overall prize. Further, people may be more competitive in competitions/tournaments if a prize is provided to a winner of the competition/tournament. Accordingly, participating in competitions and tournaments may increase the likelihood that people will correct bad habits associated with routine tasks, like bad driving habits.

BRIEF SUMMARY

The present embodiments may relate to systems and methods for generating driving profiles of users and creating driving tournaments for users based at least in part upon the driving profiles. In some embodiments, the methods may be carried out by a tournament generating (TG) server.

In one aspect, a computer system for creating driving tournaments for users may be provided. The computer system may include one processor in communication with at least one memory device. The at least one processor may be programmed to: i) receive user data associated with a plurality of users, wherein the user data include one of historical vehicle telematics data, historical mobile device data, demographic data, and location data, ii) generate, based at least in part upon the received user data, a driving profile associated with each user of the plurality of users, wherein the driving profile includes one or more driving characteristics associated with a corresponding user, iii) match one or more users based at least in part upon the one or more driving profiles associated with the one or more users, wherein a match occurs when one or more driving characteristics of the driving profiles are substantially similar, iv) create a driving tournament for the matched one or more users, wherein the driving tournament is directed to improving at least one selected driving characteristic of the matched one or more users, and wherein the driving tournament spans a predetermined time period, v) receive current vehicle telematics data and current mobile device data associated with the matched one or more users, and/or vi) determine, after the predetermined time period has ended, a winner of the driving tournament based at least in part upon the received current vehicle telematics data and current mobile device data, wherein the winner includes the user that most improved the at least one selected driving characteristic. The computer system may have additional, less, or alternate functionality, including that discussed elsewhere herein.

In another aspect, a computer-based method for creating driving tournaments for users may be provided. The method may be implemented by a computer device including one processor in communication with at least one memory device. The method may include: i) receiving user data associated with a plurality of users, wherein the user data include one of historical vehicle telematics data, historical mobile device data, demographic data, and location data, ii) generating, based at least in part upon the received user data, a driving profile associated with each user of the plurality of users, wherein the driving profile includes one or more driving characteristics associated with a corresponding user, iii) matching one or more users based at least in part upon the one or more driving profiles associated with the one or more users, wherein a match occurs when one or more driving characteristics of the driving profiles are substantially similar, iv) creating a driving tournament for the matched one or more users, wherein the driving tournament is directed to improving at least one selected driving characteristic of the matched one or more users, and wherein the driving tournament spans a predetermined time period, v) receiving current vehicle telematics data and current mobile device data associated with the matched one or more users, and/or vi) determining, after the predetermined time period has ended, a winner of the driving tournament based at least in part upon the received current vehicle telematics data and current mobile device data, wherein the winner includes the user that most improved the at least one selected driving characteristic. The method may have additional, less, or alternate functionality, including that discussed elsewhere herein.

In yet another aspect, at least one non-transitory computer-readable storage media having computer-executable instructions embodied thereon may be provided. When executed by at least one processor, the computer-executable instructions may cause the processor to: i) receive user data associated with a plurality of users, wherein the user data include one of historical vehicle telematics data, historical mobile device data, demographic data, and location data, ii) generate, based at least in part upon the received user data, a driving profile associated with each user of the plurality of users, wherein the driving profile includes one or more driving characteristics associated with a corresponding user, iii) match one or more users based at least in part upon the one or more driving profiles associated with the one or more users, wherein a match occurs when one or more driving characteristics of the driving profiles are substantially similar, iv) create a driving tournament for the matched one or more users, wherein the driving tournament is directed to improving at least one selected driving characteristic of the matched one or more users, and wherein the driving tournament spans a predetermined time period, v) receive current vehicle telematics data and current mobile device data associated with the matched one or more users, and/or vi) determine, after the predetermined time period has ended, a winner of the driving tournament based at least in part upon the received current vehicle telematics data and current mobile device data, wherein the winner includes the user that most improved the at least one selected driving characteristic. The storage media may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

Depending upon the embodiment, one or more benefits may be achieved. These benefits and various additional objects, features and advantages of the present disclosure can be fully appreciated with reference to the detailed description and accompanying drawings that follow.

Figure 1:
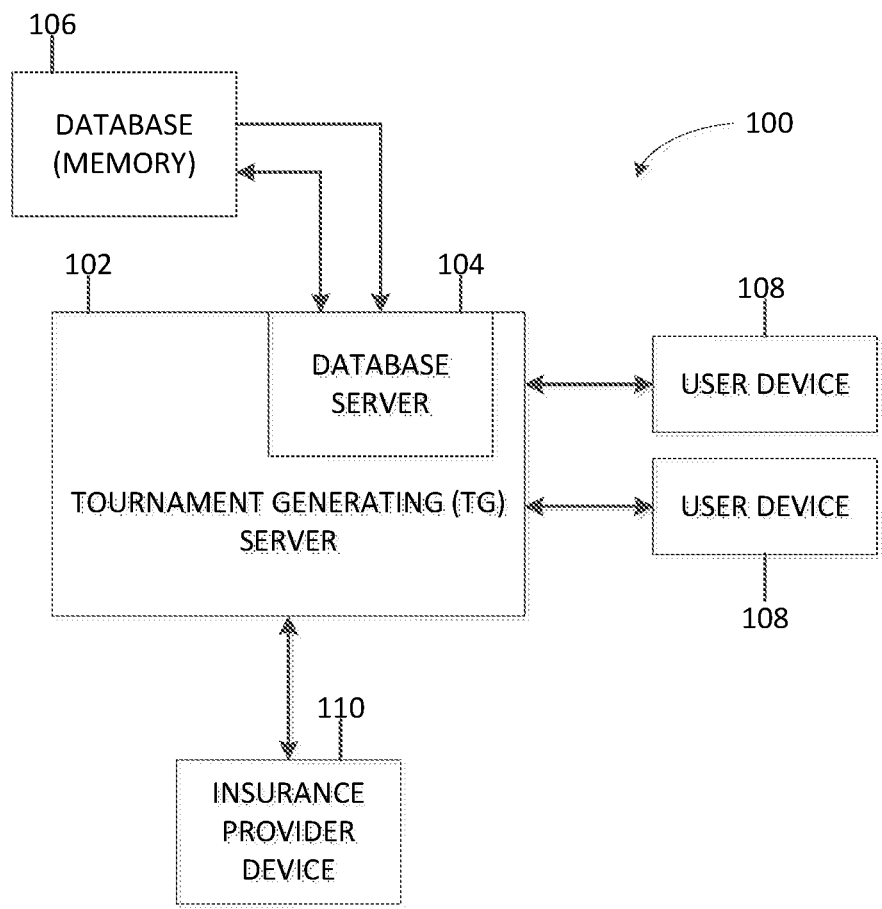
FIG. 1 depicts an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the present disclosure.

DETAILED DESCRIPTION OF THE DRAWINGS

The present embodiments may relate to, inter alia, systems and methods for creating driving tournaments for users (e.g., owners of vehicles, drivers of vehicles, etc.). In one exemplary embodiment, the process may be performed by a tournament generating ('TG') server (also referred to herein as a TG computing device or a TG computer system). In some embodiments, the TG server may be associated with an insurance provider. Further, the TG server may include one processor in communication with at least one memory device.

In the exemplary embodiment, the TG server may receive user data (e.g., historical vehicle telematics data, historical mobile device data, demographic data, location data, etc.) associated with a plurality of users. Based at least in part upon the received user data, the TG server may generate a driving profile of each user. The driving profile may include driving characteristics of each user (e.g., as determined based at least in part upon historical vehicle telematics data from sensors located on or within a mobile/user device of the user and/or a vehicle of the user). The TG server may match one or more users together based at least in part upon the users having similar driving profiles/driving characteristics. In the exemplary embodiment, the TG server may create a driving tournament for the matched one or more users, and the driving tournament may be directed to improving one or more driving characteristics of the matched one or more users (e.g., associated with the matched driving profiles). The driving tournament may last for a predetermined time period (e.g., two weeks, a month, two months, etc.).

The TG server may start receiving current vehicle telematics data (e.g., from sensors located on or within a user device of the user and/or a vehicle of the user) associated with the users. The TG server may also start receiving current mobile device data (e.g., mobile device usage data) associated with the users. After the predetermined time period has ended, the TG server may determine a winner of the driving tournament based at least in part upon the current vehicle telematics data and the current mobile device data. Further, the TG server may provide a reward to the determined winner. In some embodiments, the reward may be related to vehicle insurance and may include a discount and/or credit toward a premium of the vehicle insurance of the winner.

Examples of Receiving User Data

In the exemplary embodiment, the TG server may receive user data associated with users participating in tournaments created by the TG server. The user data may include historical vehicle telematics data, historical mobile device data, demographic data, and/or location data. The historical vehicle telematics data may include any historical data associated with the usage of a vehicle of the user, and the historical vehicle telematics data may be generated by one or more sensors included on/within a mobile device of the user (e.g., GPS, gyroscope, and/or accelerometers) and/or one or more telematics sensors included on/within a vehicle of the user. The historical mobile device data may include phone usage data. The demographic data may include age, sex, employment status, etc., and location data may include a location of a residence and/or workplace of the user.

The TG server may receive the user data directly from the users (e.g., through a mobile device of the users) and/or retrieve the user data from databases (e.g., third party databases) or through other system that store the data. For example, the users may transmit the user data (e.g., demographic and location data) to the TG server through a user device when the users are enrolling in a tournament generating service (e.g., as provided by the TG server). Further, the users may give permission for the TG server to retrieve historical vehicle telematics data and/or historical mobile device data associated with the users. Once the TG server has permission to access the historical vehicle telematics and/or historical mobile device data, the TG server may query databases of the mobile device that store the historical vehicle telematics and/or historical mobile device data. Additionally or alternatively, the TG server may query databases of an insurance provider of the user and/or databases of a mobile carrier of the user to retrieve the historical vehicle telematics data and/or the historical mobile device data.

The TG server may store the user data in a database or other memory device associated with the TG server.

Examples of Generating Driving Profiles and Matching Driving Profiles

The TG server may retrieve the user data (e.g., from the database associated with the TG server) and generate a driving profile of each user based at least in part upon the retrieved user data. The TG server may further determine driving characteristics of the user (e.g., behaviors/characteristics of how the users generally operate vehicles associated with the users), and the driving profiles may include the driving characteristics. The determined driving characteristics may include an average amount of hard braking events for a predetermined time period, an average amount of rapid acceleration events for the predetermined time period, an average amount of speeding events for the predetermined time period, an average amount of hard cornering events for the predetermined time period, an average number of miles driven for the predetermined time period, and an average amount of time utilizing a mobile device while driving for the predetermined time period.

The TG server may match users based at least in part upon the driving profiles and the driving characteristics of the users being similar. For example, if users have generally excellent driving characteristics (e.g., the users almost never speed, do not have many hard braking events, rapid acceleration, or hard cornering events, generally do not use mobile devices while driving, etc.), the driving profiles of users with excellent driving characteristics may be matched. Further, if users have generally bad driving characteristics (e.g., the users typically speed, have many hard braking, rapid acceleration, and hard cornering events, generally use mobile devices while driving, etc.), the driving profiles of users with bad driving characteristics may be matched.

The TG server may further match and/or sort the driving profiles based at least in part upon other user data including location data. The TG server may group driving profiles together by location (e.g., city, state, metropolitan area, etc.) and then match the driving profiles of the users based at least in part upon the driving characteristics of the users. For example, the driving profiles of users in a specific location and with excellent driving characteristics may be matched by the TG server. Additionally or alternatively, the TG server may further match and/or sort the users together based at least in part upon other driving characteristics. The TG server may group driving profiles together by location and an average amount of miles driven by the users over a predetermined time period and then match the driving profiles of the users based at least in part upon the other driving characteristics of the users. For example, the driving profiles of users in a specific location, who drive between 250 and 500 miles per month, and who have bad driving characteristics may be matched by the TG server. Matching users based at least in part upon driving characteristics ensures that driving tournaments created for the users are fair.

In other embodiments, the TG server may match users based at least in part upon a group of users created by the users of the group. For example, friends, family, and/or coworkers may wish to be included in a group together (e.g., be matched by the TG server). A user of the group may transmit a list of users of the group to the TG server (e.g., through a user interface of a mobile device of the users), and the TG server may match the users of the group (e.g., a tournament group) as defined in the list.

The TG server may store the matched driving profiles (and users associated with the matched driving profiles) in a database associated with TG server.

Examples of Creating Driving Tournaments

The TG server may create a driving tournament for the matched one or more users, and the driving tournament may be directed to improving one or more driving characteristics of the matched one or more users. Further, the driving tournament may be generated to span a certain time period (e.g., two weeks, a month, two months, etc.).

The driving tournaments may be directed to, for example, reducing a number of hard braking events for users, reducing a number of hard cornering events of users, and/or reducing a length of time in which users utilize mobile devices of the users while driving. Challenges associated with the driving tournaments may include, for example, having the fewest number of hard braking events, going the longest amount of time without having a hard cornering event, and/or having the shortest amount of time using a mobile device while driving. The driving tournaments may also be directed to reducing the amount of time the users speed, reducing miles driven of the users, and any other metric that may improve driving characteristics of the users.

Once the users have been matched and the driving tournament has been created for the matched one or more users, the TG server may transmit a notification to the users (e.g., on a user device) indicating that the users have been matched and a driving tournament has been created for the users. The notification may further include the challenge associated with the driving tournament, a start data of the driving tournament, a time period for the driving tournament, and any other information regarding the driving tournament. In some embodiments, the TG server may prompt the user to accept terms and conditions associated with the driving tournament (e.g., giving the TG server access to user data, etc.) and/or participating in the driving tournament. In other embodiments, the users may accept terms and conditions associated with the driving tournaments and/or may agree to participate in any created driving tournament associated with the users when the users enroll/register in the tournament generating service.

The driving tournaments may be structured in many different ways. In some embodiments, the structure of the driving tournaments may be predetermined (e.g., by an insurance provider associated with TG server). In other embodiments, the structure of the driving tournaments may be determined by the TG server when the TG server is creating the driving tournaments based at least in part upon certain characteristics of the driving tournaments (e.g., how many users are participating, to what the challenge of the driving tournament relates, etc.). The structure of the driving tournaments may include round robin (e.g., where each user competes against each other matched user), single elimination (e.g., users are eliminated after a "loss" or bad driving characteristic event), double elimination (e.g., users are eliminated after two "losses" or bad driving characteristic events), and any other suitable tournament style. For example, the driving tournaments may start with multiple one-on-one matches between users. The winner of each match may advance to the next match against another user that advance for another one-on-one match until each user has been eliminated except for one (e.g., the winner).

Examples of Receiving Current Vehicle Telematics Data and Current Mobile Device Data Once the users have been enrolled in and/or agree to participate in the generated tournament, the TG server may begin to receive current telematics data (also referred to herein as vehicle telematics data) and current mobile device data associated with the users. That is, the TG server may begin to receive current telematics data from GPS sensors, accelerometers, and/or gyroscopes included in user devices of the users using the corresponding vehicles and/or telematics sensors included in or on the vehicles of the users. The TG server may receive the current telematics data after each trip completed by the users or after any predetermined length of time (e.g., at the end of each day, twice a day, at the end of each week, etc.). Further, in some embodiments, the TG server may receive the vehicle telematics data in real time or in near-real time. Further, the TG server may begin to receive current mobile device data from mobile devices of the users. The mobile device data may relate to mobile device usage data including, for example, when the users use the mobile devices and for what the users are using the mobile device (e.g., talking on the phone, texting, using maps, browsing social media, etc.). The TG server may receive the current mobile device data after any predetermined length of time (e.g., at the end of each day, twice a day, at the end of each week, etc.) and/or in real time or near-real time.

From the current telematics data and the current mobile device data, when the current telematics data and the current mobile device data are received by the TG server, the TG server may utilize the current telematics data and the current mobile device data to determine certain driving characteristics of the users. For example, the TG server may determine when a hard braking, hard cornering, or rapid acceleration event has occurred, a time between these events, determine how many hard braking, hard cornering, or rapid acceleration events happened within the predetermined time associated with the driving tournament, whether users utilized mobile devices while driving and how long the users utilized the mobile devices while driving, etc. The TG server may store the determined information in a database associated with the TG server. Further, the TG server may delete the stored determined information after each predesignated time period associated with the driving tournament has passed.

If, for example, there are multiple users driving together in a vehicle, the TG server may determine a driver of the vehicle. The TG server may determine the driver of the vehicle through user input (e.g., prompting each of the users to input whether the user is a passenger or the driver), through matching known driving characteristics of the users with the driving characteristics of the driver (e.g., by matching driving profiles of the driver to driving profiles of each user to determine which driving profile is most similar), determining which user device is located nearest to the driver seat, and/or through any other driver determination method. It may be needed for the TG server to determine the driver of a vehicle, especially in instances where multiple drivers participating in driving tournaments are in a vehicle together. Accordingly, the TG server may only attribute the received current telematics data and/or received current mobile device data to the determined driver of the vehicle instead of to each user of the vehicle (e.g., the passengers).

Examples of Determining a Winner of the Tournament and Providing a Reward to the Winner After the predetermined time period associated with the driving tournament has ended, the TG server may determine a winner of the driving tournament based at least in part upon the received current telematics data and current mobile device data. The winner of the driving tournament may include the user with the most improved driving characteristic associated with the driving tournament. The winner may refer to the winner of a match (e.g., a one-on-one match in which multiple matches comprise the driving tournament) or the winner may refer to the winner of the driving tournament (e.g., the winner of all of the matches and therefore the driving tournament).

For a first example, the created driving tournament may be directed to reducing a number of hard braking events, and the driving tournament may be structured as a single elimination tournament. Accordingly, the TG server may determine, based at least in part upon the current vehicle telematics data and the current mobile device data, a number of hard braking events for each matched user over the predetermined time period of the driving tournament. The TG server may compare the number of hard braking events for each match and determine that a winner of each match is the user with the fewest number of hard braking events, and the other user of the match may be eliminated. The TG server may continue comparing the number of hard braking events between users until all of the matched one or more users are eliminated except for one. The TG server may accordingly determine that the user left is the winner of the driving tournament. The TG server may store the winner of the driving tournament and/or the winner of each match in a database associated with the TG server.

For a second example, the created driving tournament may be directed to reducing a number of hard cornering events, and the driving tournament may be structured as a round robin tournament. Accordingly, the TG server may determine, based at least in part upon the current vehicle telematics data and the current mobile device data, a longest amount of time each user went without a hard cornering event over the predetermined time of the driving tournament. The TG server may compare the determined amount of time of each user with the determined amount of time with each other matched user and track a number of times that each user has the longest amount of time compared to each other matched user. The TG server may compare the tracked number of times that each user was the winner of the match. Accordingly, the TG server may determine that the winner of the driving tournament is the user with the most tracked number of times. The TG server may store the winner and the tracked number of times in a databased associated with the TG server.

For a third example, the created driving tournament may be directed to reducing a length of time in which each user utilizes the mobile device of the user while driving, and the driving tournament may be structured as a single elimination tournament. Accordingly, the TG server may determine, based at least in part upon the current vehicle telematics data and the current mobile device data, an amount of time each user utilized the mobile device of the user while driving over the predetermined time period of the driving tournament. The TG server may compare the amounts of time for each match and determine that a winner of each match is the user with the least amount of time utilizing the mobile device of the user while driving, and the other user of the match may be eliminated. The TG server may continue comparing the amounts of time between users until all of the matched one or more users are eliminated except for one. The TG server may accordingly determine that the user left is the winner of the driving tournament. The TG server may store the winner of the driving tournament and/or the winner of each match in a database associated with the TG server.

The TG server may further provide a reward to the determined winner of the driving tournament. In some embodiments, especially when the TG server is associated with an insurance provider, the reward may include an insurance premium discount (e.g., for a subsequent insurance premium associated with an insurance policy of the user), an insurance premium deduction, and/or an insurance premium credit. In other embodiments, the reward may be any suitable reward including merchant gift cards, prepaid cards, check, digital currency, digital wallet credits, etc.

At least one of the technical problems addressed by the systems and methods described herein may include: (i) inability to create tournaments for users (e.g., drivers) based at least in part upon telematics data, (ii) inability to match drivers for tournaments based at least in part upon driving characteristics and driving profiles, (iii) inability to determine winners of driving tournaments based at least in part upon received vehicle telematics data, and/or (iv) inability to create tournaments that are directed to improving driving characteristics and behaviors of drivers involved in the tournament.

The methods and systems described herein may be implemented using computer programming or engineering techniques including computer software, firmware, hardware, or any combination or subset thereof, wherein the technical effects may be achieved by performing at least one of the following steps: i) receive user data associated with a plurality of users, wherein the user data include one of historical vehicle telematics data, historical mobile device data, demographic data, and location data, ii) generate, based at least in part upon the received user data, a driving profile associated with each user of the plurality of users, wherein the driving profile includes one or more driving characteristics associated with a corresponding user, iii) match one or more users based at least in part upon the one or more driving profiles associated with the one or more users, wherein a match occurs when one or more driving characteristics of the driving profiles are substantially similar, iv) create a driving tournament for the matched one or more users, wherein the driving tournament is directed to improving at least one selected driving characteristic of the matched one or more users, and wherein the driving tournament spans a predetermined time period, v) receive current vehicle telematics data and current mobile device data associated with the matched one or more users, and/or vi) determine, after the predetermined time period has ended, a winner of the driving tournament based at least in part upon the received current vehicle telematics data and current mobile device data, wherein the winner includes the user that most improved the at least one selected driving characteristic.

At least one of the technical solutions provided by the systems and methods described herein may include: (i) creating tournaments for drivers based at least in part upon telematics data, (ii) matching drivers for tournaments based at least in part upon generated driving profiles, (iii) determining winners of driving tournaments based at least in part upon received current vehicle telematics data, and/or (iv) creating tournaments for drivers that are based at least in part upon improving driving characteristics and behaviors of the drivers involved in the tournament.

Exemplary Computer Networks

FIG. 1 depicts a simplified block diagram of an exemplary computer system 100 for generating tournaments for users (e.g., associated with user devices 108). In the exemplary embodiment, system 100 may include a tournament generating (TG) server 102 and a database server 104. TG server 102 may be in communication with one or more databases 106 (or other memory devices), user devices 108, and/or insurance provider devices 110.

In the exemplary embodiment, user devices 108 may be computers that include a web browser or a software application, which enables user devices 108 to access remote computer devices, such as TG server 102, using the Internet or other network. More specifically, user devices 108 may be communicatively coupled to TG server 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

An insurance provider device 110 may be communicatively coupled with TG server 102. In some embodiments, insurance provider device 110 may be associated with, or is part of a computer network associated with an insurance provider, or in communication with the insurance provider's computer network (not shown). In other embodiments, insurance provider device 110 may be associated with a third party and is merely in communication with the insurance provider's computer network. That is, insurance provider device 110 may be associated with the insurance provider of the user. More specifically, insurance provider device 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users (e.g., demographics data and location data), vehicle telematics data associated with the users, driving profile data (e.g., based at least in part upon the vehicle telematics data of the users), tournament data (e.g., one or more tournaments in which each user is presently involved), winner/reward data (e.g., relating to current coverage amounts), etc. In the exemplary embodiment, database 106 may be stored remotely from TG server 102. In some embodiments, database 106 may be decentralized. In the exemplary embodiment, a user may access database 106 and/or TG server 102 via user device 108.

TG server 102 may be in communication with a plurality of user devices 108 and insurance provider device 110 to match the users (e.g., the user profiles) and create tournaments for the users. In some embodiments, TG server 102 may be associated with an insurance provider or in communication with the insurance provider's computer network (not shown). In other embodiments, TG server 102 may be associated with a third party and may merely be in communication with the insurance provider device 110.

Exemplary Processes for Providing Reimbursement Controls

Figure 2:
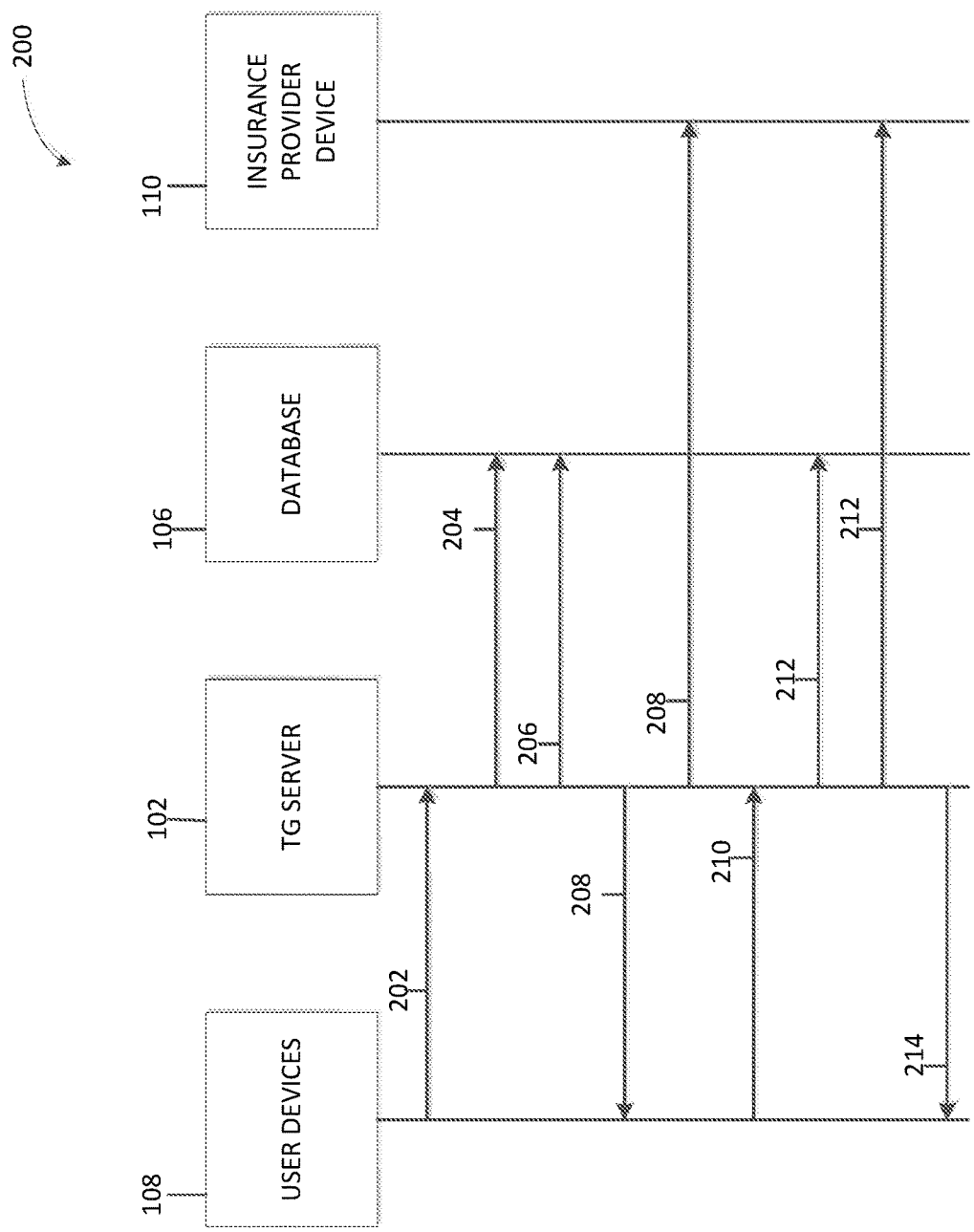
FIG. 2 depicts a flow chart of an exemplary process that may be carried out by the computer system illustrated in FIG. 1.

FIG. 2 illustrates a flow chart of an exemplary process 200 for creating driving tournaments for users (e.g., associated with user devices 108). Process 200 may be carried out by computer system 100 (shown in FIG. 1).

TG server 102 may receive user data 202 from user device 108. In the exemplary embodiment, user data 202 may include historical vehicle telematics data, historical mobile device data, demographic data, and location data. User data 202 may be generated from user devices 108, sensors associated with user devices 108 (e.g., accelerometers, gyroscopes, and/or GPS), and/or sensors associated with vehicles of the users. In other embodiments, TG server 102 may query other databases (e.g., third party databases) to receive user data 202.

From user data 202, TG server 102 may generate driving profiles 204 of the users associated with user data 202. Driving profiles 204 may include driving characteristics of the users, and the driving characteristics may include one of (i) an average amount of hard braking events of each user for a predetermined time period, (ii) an average amount of rapid acceleration events of each user for the predetermined time period, (iii) an average amount of speeding events of each user for the predetermined time period, (iv) an average amount of hard cornering events of each user for the predetermined time period, (v) an average number of miles driven by each user for the predetermined time period, and (vi) an average amount of time each user utilized a mobile device of the user while driving for the predetermined time period. Driving profiles 204 may be stored in database 106 (e.g., associated with TG server 102). Further, TG server 102 may match users based at least in part upon driving profiles 204. A match may occur when one or more driving characteristics of the driving profiles are substantially similar. Matched one or more users 206 and corresponding driving profiles 204 of matched one or more users 206 may be stored in database 106.

TG server 102 may create driving tournaments 208 for matched one or more users 206 and may transmit driving tournaments 208 to user devices 108 (e.g., driving tournaments may be displayed on user devices 108). Driving tournaments 208 may be directed to improving at least one selected driving characteristic of matched one or more users 206, and driving tournaments 208 may span a predetermined time period. Further, TG server 102 may transmit driving tournaments 208 to insurance provider device 110 (e.g., for the insurance provider associated with insurance provider device 110 to determine rewards associated with driving tournaments 208).

After creating driving tournaments 208, TG server 102 may receive current vehicle telematics data 210 and current mobile device data 210 from user devices 108. Current vehicle telematics data 210 may relate to any information relating to how users operate the vehicles of the users and may be from sensors of user devices 108 and/or the vehicles of the users. Current mobile device data 210 may relate to mobile phone usage data and may be used to determine whether the users utilized user devices 108 while driving and/or how long the users utilized user devices 108 while driving.

TG server 102 may aggregate current vehicle telematics data 210 and current mobile device data 210 from user devices 102 over the predetermined time periods associated with driving tournaments 208. Based at least in part upon the selected driving characteristic of driving tournaments 208 and current vehicle telematics data 210 and current mobile device data 210, TG server 102 may determine a winner 212 associated with driving tournament 208. TG server may store the determined winner 212 in database 106 and/or transmit determined winner 212 to insurance provider device 110.

For example, driving tournament 208 may be directed to reducing a number of hard braking events of each user. Accordingly, TG server 102 may determine, based at least in part upon current vehicle telematics data 210 and current mobile device data 210, a number of hard braking events for each user over the predetermined time period. TG server 102 may compare the determined number of hard braking events for each user and determine that winner 212 of driving tournament 208 is the user with the fewest number of hard braking events over the predetermined time period.

Further, TG server 102 may transmit a reward 214 to determined winner 212. For example, reward may be at least one of an insurance premium discount, an insurance premium deduction, and an insurance premium credit. TG server 102 may receive reward 214 from insurance provider device 110 and transmit reward 214 to winner 212 on behalf of the insurance provider associated with insurance provider device 110.

Exemplary User Devices

Figure 3:
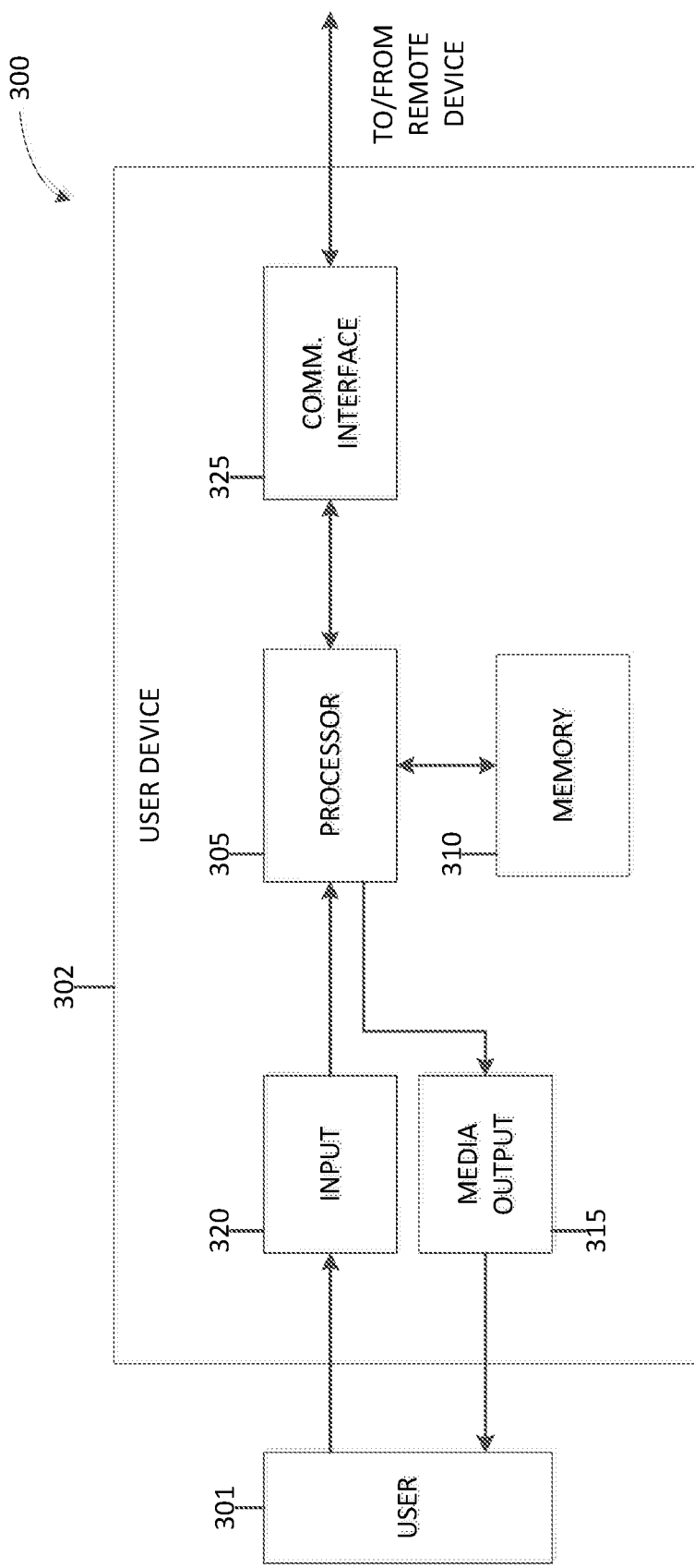
FIG. 3 depicts an exemplary client computing device that may be used with the exemplary computer system illustrated in FIG. 1.

FIG. 3 depicts an exemplary configuration 300 of a user computer device 302 (e.g., user device 108, shown in FIG. 1), in accordance with one embodiment of the present disclosure. User computer device 302 may be operated by a user 301. User computer device 302 may include, but is not limited to, user device 108 and insurance provider device 110 (shown in FIG. 1). User computer device 302 may include a processor 305 for executing instructions. In some embodiments, executable instructions may be stored in a memory 310. Processor 305 may include one or more processing units (e.g., in a multi-core configuration). Memory 310 may be any device allowing information such as executable instructions and/or transaction data to be stored and retrieved. Memory 310 may include one or more computer readable media.

User computer device 302 may also include one media output component 315 for presenting information to user 301. Media output component 315 may be any component capable of conveying information to user 301. In some embodiments, media output component 310 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. In some embodiments, user computer device 302 may include an input device 320 for receiving input from user 301. User 301 may use input device 320 to, without limitation, provide user data, accept an invitation/enrollment in a generated tournament, provide comments to other users in a generated tournament, and/or receive a reward if the user is the winner of a tournament.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325 communicatively coupled to a remote device, such as TG server 102 (shown in FIG. 1). Communication interface 325 may include, for example, a wired or wireless network adapter and/or a wireless data transceiver for use with a mobile telecommunications network.

Stored in memory 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from TG server 102 (shown in FIG. 1). A client application may allow user 301 to interact with, for example, TG server 102. For example, instructions may be stored by a cloud service, and the output of the execution of the instructions sent to the media output component 315.

Exemplary Server Devices

Figure 4:
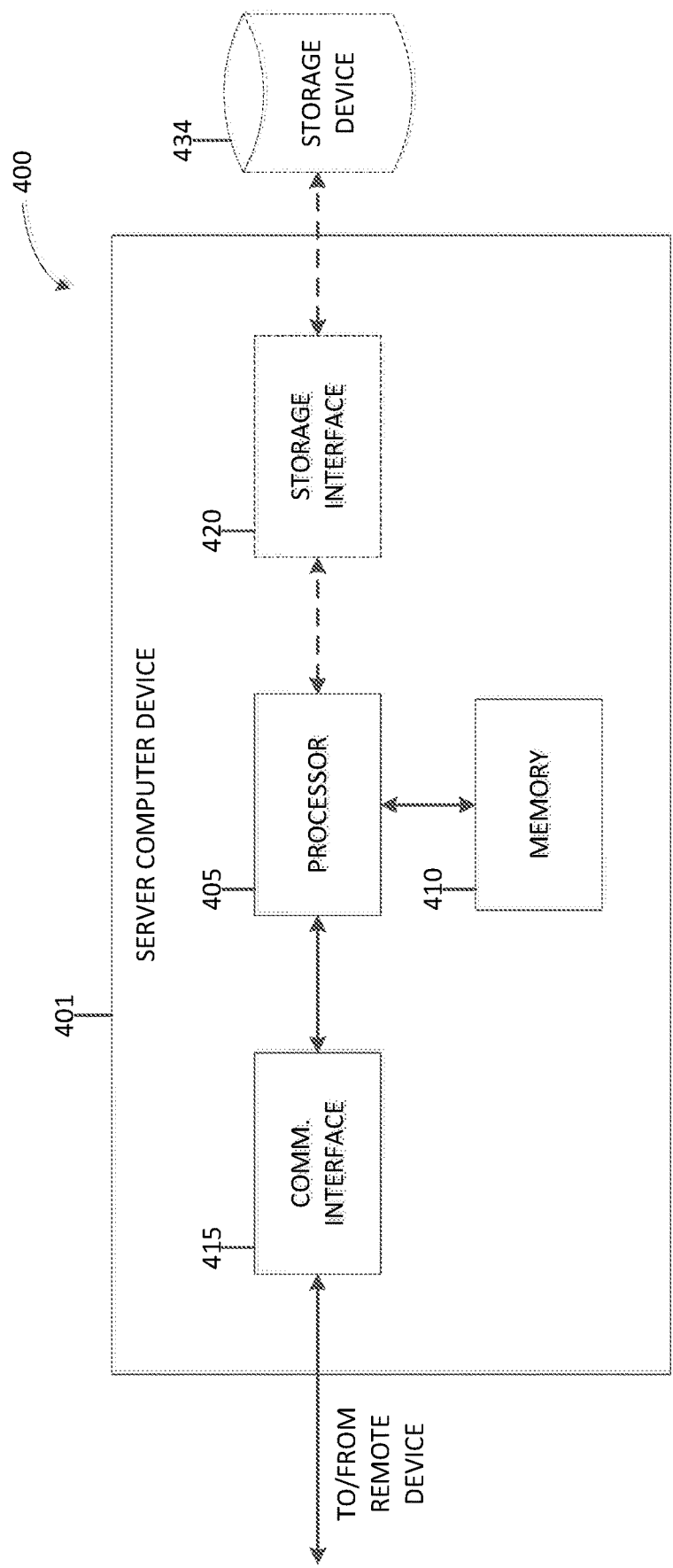
FIG. 4 depicts an exemplary server system that may be used with the exemplary computer system illustrated in FIG. 1.

FIG. 4 depicts an exemplary configuration of a server system 400, in accordance with one embodiment of the present disclosure. A server computer device 401 may include, but is not limited to, TG server 102 and database server 104 (both shown in FIG. 1). Server computing device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 401 is capable of communicating with a remote device such as another server computer device 401, TG server 102, user device 108, and insurance provider device 110 (shown in FIG. 1). For example, communication interface 415 may receive inputs, such as predesignated policy selections and/or submitted claims from user device 108 (shown in FIG. 1).

Processor 405 may also be operatively coupled to a storage device 420. Storage device 420 may be any computer-operated hardware suitable for storing and/or retrieving data. In some embodiments, storage device 420 may be integrated in server computer device 401. For example, server computer device 401 may include one or more hard disk drives as storage device 420.

In other embodiments, storage device 420 may be external to server computer device 401 and may be accessed by a plurality of server computer devices 401. For example, storage device 420 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 420 via a storage interface 434. Storage interface 434 may be any component capable of providing processor 405 with access to storage device 420. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 may execute computer-executable instructions for implementing aspects of the disclosure. In some embodiments, the processor 405 may be transformed into a special purpose microprocessor by executing computer-executable instructions or by otherwise being programmed, as described below in more detail with regard to FIG. 6.

Exemplary Computer Devices

Figure 5:
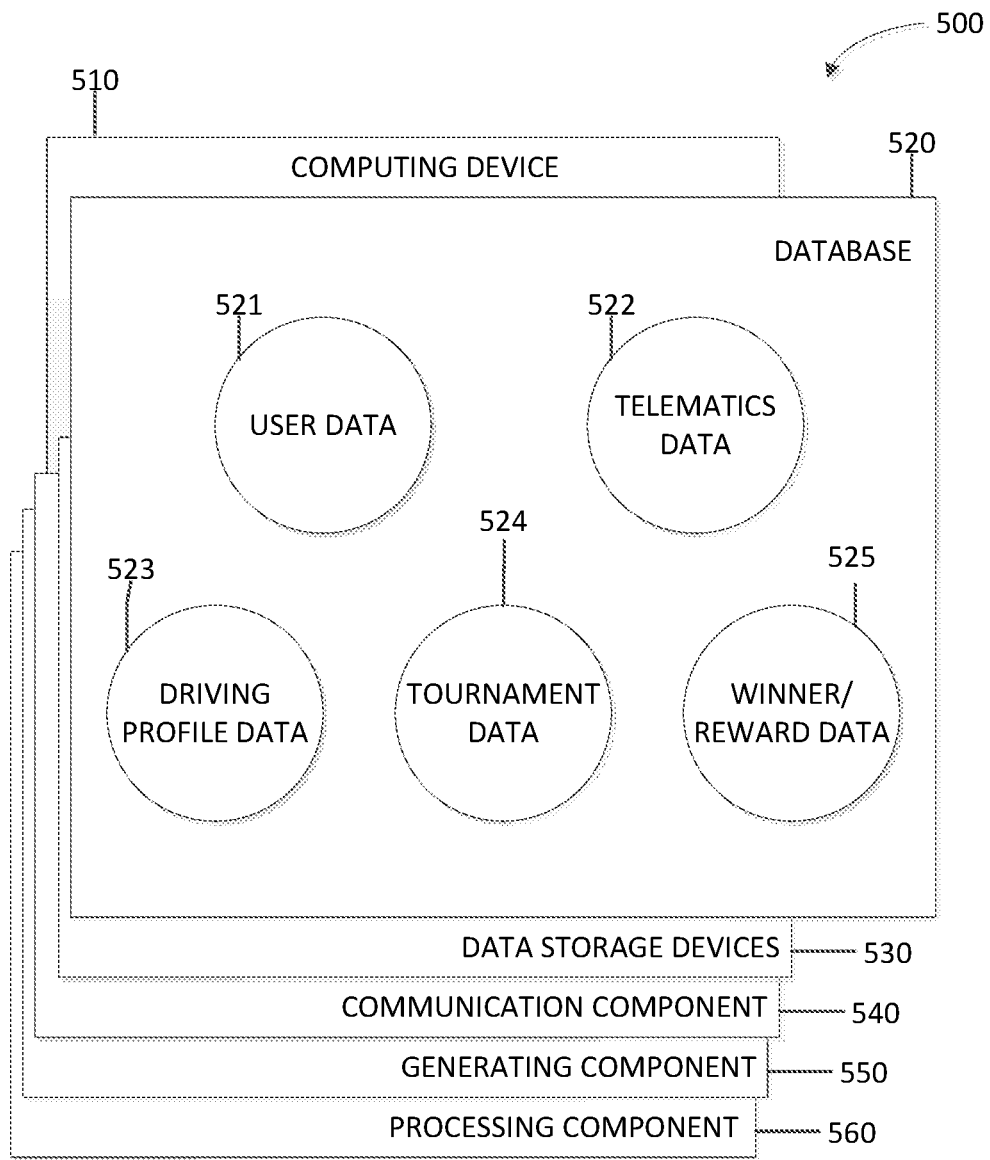
FIG. 5 illustrates a diagram of components of one or more exemplary computing devices that may be used in the exemplary computer system shown in FIG. 1.

FIG. 5 depicts a diagram 500 of components of one or more exemplary computing devices that may be used in system 100 (shown in FIG. 1) and/or to carry out process 200 (shown in FIG. 2).

In some embodiments, computing device 510 may be similar to TG server 102 (shown in FIG. 1). Database 520 may be coupled with several separate components within computing device 510, which perform specific tasks. In this embodiment, database 520 may include user data 521 (e.g., demographics data including age and gender and location data), telematics data 522 (e.g., current and historical vehicle telematics data of users generated by sensors of a user device of the user and/or a vehicle of the user), driving profile data 523 (e.g., generated driving profiles based at least in part upon received telematics data), tournament data 524 (e.g., generated tournaments and current tournament rankings), and winner/reward data 525 (e.g., rewards associated with winning tournaments and determined winners of each tournament). In some embodiments, database 520 is similar to database 106 (shown in FIG. 1).

Computing device 510 may include database 520, as well as a data storage device 530. Computing device 510 may also include a communication component 540 for transmitting and receiving data between TG server 102, user devices 108, and insurance provider device 110 (shown in FIG. 1). Computing device 510 may further include a generating component 550 that may, for example, generate tournaments based at least in part upon driving profiles of users. A processing component 560 may, for example, assist with processing vehicle telematics data of users and processing rewards for determined winners of tournaments.

Exemplary Computer-Implemented Methods

Figure 6:
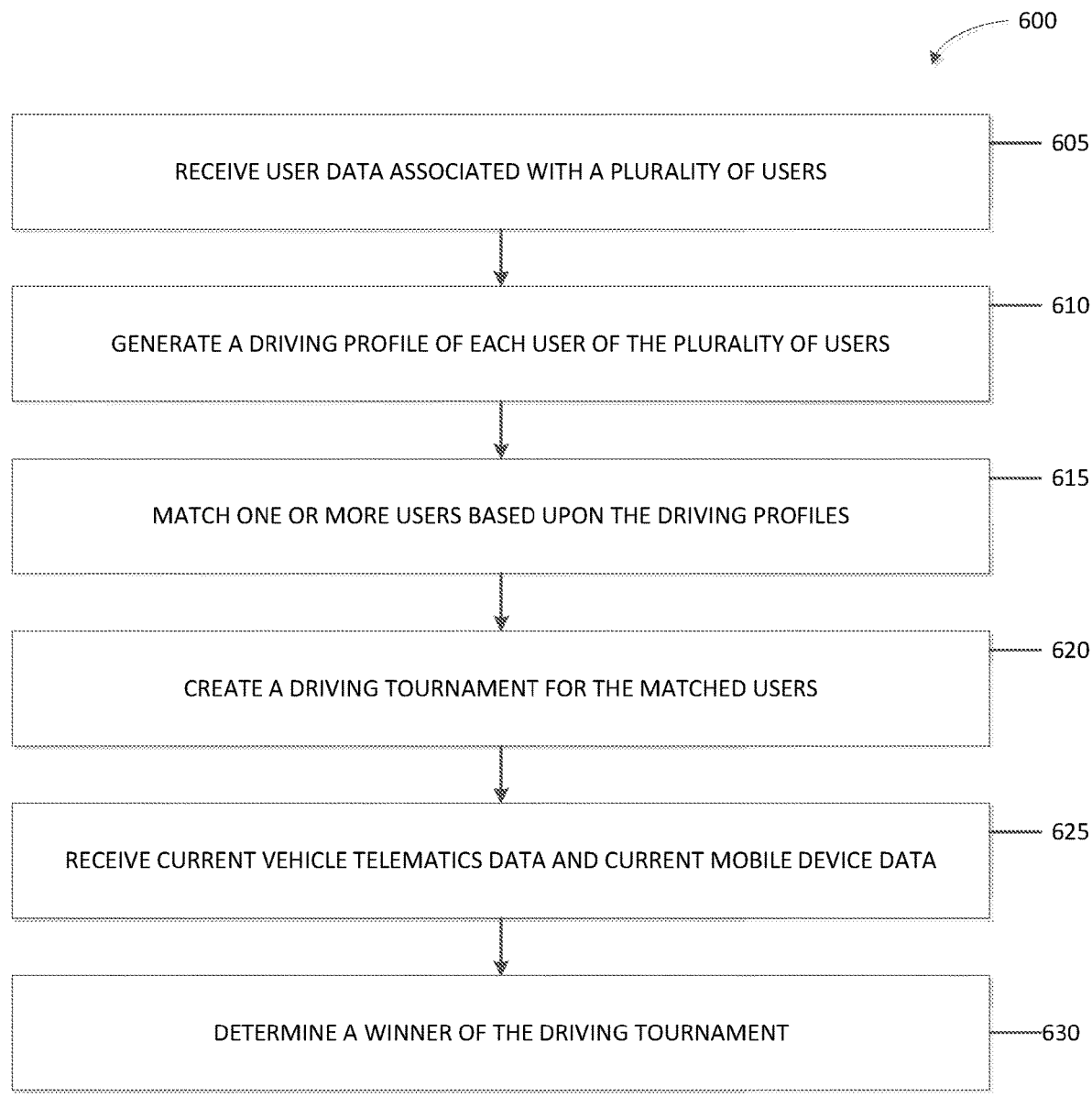
FIG. 6 illustrates a flow chart of an exemplary computer-implemented process that may be carried out by the exemplary computer system shown in FIG. 1.

FIG. 6 illustrates a flow chart of an exemplary computer-implemented method 600 for creating driving tournaments for users. Method 600 may be implemented, at least in part, by a computing device/server, for example, TG server 102 (shown in FIG. 1).

In the exemplary embodiment, method 600 may include receiving 605 user data associated with a plurality of users. User data may include one of historical vehicle telematics data, historical mobile device data, demographic data, and location data. Method 600 may further include generating 610 a driving profile of each user based at least in part upon the received 605 user data. The driving profile may include driving characteristics of the users. Method 600 may further include matching 615 one or more users based at least in part upon the one or more driving profiles associated with the one or more users. A match may occur when one or more driving characteristics of the driving profiles are substantially similar.

Method 600 may further includes creating 620 a driving tournament for the matched 615 users, and the driving tournament may be directed to improving at least one selected driving characteristic of the matched 615 users over a predetermined time period. Additionally, method 600 may include receiving 625 current vehicle telematics data and current mobile device data associated with the matched 615 users. Based at least in part upon the current vehicle telematics data and current mobile device data, a winner may be determined 630 after the predetermined time period. The winner may include the user that most improved the at least one selected driving characteristic.

Exemplary Embodiments & Functionalities

In the exemplary embodiment, a computer system for creating driving tournaments for users may be provided. The computer system may include one processor in communication with at least one memory device. The at least one processor may be programmed to: i) receive user data associated with a plurality of users, wherein the user data include one of historical vehicle telematics data, historical mobile device data, demographic data, and location data, ii) generate, based at least in part upon the received user data, a driving profile associated with each user of the plurality of users, wherein the driving profile includes one or more driving characteristics associated with a corresponding user, iii) match one or more users based at least in part upon the one or more driving profiles associated with the one or more users, wherein a match occurs when one or more driving characteristics of the driving profiles are substantially similar, iv) create a driving tournament for the matched one or more users, wherein the driving tournament is directed to improving at least one selected driving characteristic of the matched one or more users, and wherein the driving tournament spans a predetermined time period, v) receive current vehicle telematics data and current mobile device data associated with the matched one or more users, and/or vi) determine, after the predetermined time period has ended, a winner of the driving tournament based at least in part upon the received current vehicle telematics data and current mobile device data, wherein the winner includes the user that most improved the at least one selected driving characteristic. The computer system may have additional, less, or alternate functionality, including that discussed elsewhere herein.

For example, additional functionality may include the at least one processor further being programmed to: i) provide a reward to the winner of the driving tournament, wherein the reward is at least one of an insurance premium discount, an insurance premium deduction, and an insurance premium credit, ii) receive a predetermined tournament group from a user included in the predetermined tournament group, wherein the predetermined tournament group includes a group of users that wish to compete in a driving tournament together, and iii) create the driving tournament for the predetermined tournament group. Further, generating a driving profile for each user may include determining, based at least in part upon the user data, one or more driving characteristics associated with each user, wherein the driving characteristics include one of (a) an average amount of hard braking events of each user for a predetermined time period, (b) an average amount of rapid acceleration events of each user for the predetermined time period, (c) an average amount of speeding events of each user for the predetermined time period, (d) an average amount of hard cornering events of each user for the predetermined time period, (e) an average number of miles driven by each user for the predetermined time period, and (f) an average amount of time each user utilized a mobile device of the user while driving for the predetermined time period. The users may be matched based at least in part upon the users having similar driving characteristics.

Further, the driving tournament may be directed to reducing a number of hard braking events of each user, and the at least one processor may be further programmed to: i) determine, based at least in part upon the current vehicle telematics data and the mobile device data, a number of hard braking events for each user over the predetermined time period, ii) store, in the at least one memory device, the determined number of hard braking events for each user, iii) compare the determined number of hard braking events for each user, and iv) determine that the winner of the driving tournament is the user with the fewest number of hard braking events over the predetermined time period.

Additionally, the driving tournament may be directed to reducing a number of hard cornering events of each user, and the at least one processor may be further programmed to: i) determine, based at least in part upon the current vehicle telematics data and the mobile device data, a longest amount of time each user went without a hard cornering event over the predetermined time period, ii) store, in the at least one memory device, the determined longest amount of time for each user, iii) compare the determined longest amount of time for each user, and iv) determine that the winner of the driving tournament is the user with the longest amount of time without a hard cornering event.

Even further, the driving tournament may be directed to reducing a length of time in which each user utilizes the mobile device of the user while driving, and the at least one processor may be further programmed to: i) determine, based at least in part upon the current vehicle telematics data and the mobile device data, an amount of time each user utilized the mobile device of the user while driving, ii) store, in the at least one memory device, the determined amount of time each user utilized the mobile device of the user while driving, iii) compare the stored determined amount of time each user utilized the mobile device of the user while driving, and iv) determine that the winner of the driving tournament is the user with the shortest amount of time utilizing the mobile device of the user while driving. The driving tournament may include one of a round robin tournament, a single elimination tournament, and a double elimination tournament.

Further, in the exemplary embodiment, a computer-based method for creating driving tournaments for users may be provided. The method may be implemented by a computer device including one processor in communication with at least one memory device. The method may include: i) receiving user data associated with a plurality of users, wherein the user data include one of historical vehicle telematics data, historical mobile device data, demographic data, and location data, ii) generating, based at least in part upon the received user data, a driving profile associated with each user of the plurality of users, wherein the driving profile includes one or more driving characteristics associated with a corresponding user, iii) matching one or more users based at least in part upon the one or more driving profiles associated with the one or more users, wherein a match occurs when one or more driving characteristics of the driving profiles are substantially similar, iv) creating a driving tournament for the matched one or more users, wherein the driving tournament is directed to improving at least one selected driving characteristic of the matched one or more users, and wherein the driving tournament spans a predetermined time period, v) receiving current vehicle telematics data and current mobile device data associated with the matched one or more users, and/or vi) determining, after the predetermined time period has ended, a winner of the driving tournament based at least in part upon the received current vehicle telematics data and current mobile device data, wherein the winner includes the user that most improved the at least one selected driving characteristic. The method may have additional, less, or alternate functionality, including that discussed elsewhere herein.

Even further, in the exemplary embodiment, at least one non-transitory computer-readable media having computer-executable instructions thereon may be provided. When executed by at least one processor of a computer system in communication with at least one memory device, the instructions may cause the at least one processor to: i) receive user data associated with a plurality of users, wherein the user data include one of historical vehicle telematics data, historical mobile device data, demographic data, and location data, ii) generate, based at least in part upon the received user data, a driving profile associated with each user of the plurality of users, wherein the driving profile includes one or more driving characteristics associated with a corresponding user, iii) match one or more users based at least in part upon the one or more driving profiles associated with the one or more users, wherein a match occurs when one or more driving characteristics of the driving profiles are substantially similar, iv) create a driving tournament for the matched one or more users, wherein the driving tournament is directed to improving at least one selected driving characteristic of the matched one or more users, and wherein the driving tournament spans a predetermined time period, v) receive current vehicle telematics data and current mobile device data associated with the matched one or more users, and/or vi) determine, after the predetermined time period has ended, a winner of the driving tournament based at least in part upon the received current vehicle telematics data and current mobile device data, wherein the winner includes the user that most improved the at least one selected driving characteristic. The instructions may direct additional, less, or alternate functionality, including that discussed elsewhere herein.

Examples of Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, home owner and/or home, buyer, geolocation information, image data, home sensor data, and/or other data.

Based at least in part upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict suggestions for offers to present to user and/or offers that processing device may switch to without specifically requesting permission from the user. The processing element may also learn how to identify different types of problems and/or issues with offers to assist the user with choosing which offer to select.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

I claim:

1. A computer system for creating driving tournaments for users, the computer system comprising:
   at least one memory device; and
   at least one processor in communication with the at least one memory device and programmed to:
   receive user data associated with a plurality of users, the user data including one or more of historical vehicle telematics data, historical mobile device usage data, demographic data, and location data;
   generate, based at least in part upon the user data, a driving profile associated with each user of the plurality of users, the driving profile associated with each user including one or more driving characteristics;
   classify one or more driving profiles associated with one or more users into a group based at least in part upon location and first driving characteristics of the one or more driving characteristics in the one or more driving profiles;
   match the one or more users by matching the one or more driving profiles in the group based at least in part upon second driving characteristics of the one or more driving characteristics in the one or more driving profiles, wherein a match occurs when the second driving characteristics of the one or more driving characteristics in the one or more driving profiles are similar;
   create a driving tournament for the matched one or more users, the driving tournament being directed to improving at least one selected driving characteristic of the matched one or more users and spans a predetermined time period;
   receive current vehicle telematics data and current mobile device usage data associated with the matched one or more users, the current mobile device usage data indicating usage of respective mobile devices by the matched one or more users; and
   determine, after the predetermined time period has ended, a winner of the driving tournament based at least in part upon the current vehicle telematics data and current mobile device usage data, the winner being a user that has most improved the at least one selected driving characteristic.

2. The computer system of claim 1, wherein the at least one processor is further programmed to:
   provide a reward to the winner of the driving tournament, the reward being at least one of an insurance premium discount, an insurance premium deduction, and an insurance premium credit.

3. The computer system of claim 1, wherein the at least one processor is further programmed to:
   receive a predetermined tournament group from a user included in the predetermined tournament group, the predetermined tournament group including a group of users that wish to compete in the driving tournament together; and
   create the driving tournament for the predetermined tournament group.

4. The computer system of claim 1, wherein to generate the driving profile associated with each user, the at least one processor is programmed to:
   determine, based at least in part upon the user data, the one or more driving characteristics associated with each user, the one or more driving characteristics including one or more of: (i) an average amount of hard braking events of each user for a predetermined time period, (ii) an average amount of rapid acceleration events of each user for the predetermined time period, (iii) an average amount of speeding events of each user for the predetermined time period, (iv) an average amount of hard cornering events of each user for the predetermined time period, (v) an average number of miles driven by each user for the predetermined time period, and (vi) an average amount of time each user utilized a mobile device while driving for the predetermined time period.

5. The computer system of claim 1, wherein the at least one selected driving characteristic to be improved in the driving tournament is to reduce hard braking events, and the at least one processor is further programmed to:
    determine, based at least in part upon the current vehicle telematics data and the current mobile device usage data, a number of hard braking events for each user over the predetermined time period;
    store, in the at least one memory device, the number of hard braking events for each user;
    compare the number of hard braking events for each user; and
    determine the winner of the driving tournament to be the user with a fewest number of hard braking events over the predetermined time period.

6. The computer system of claim 1, wherein the at least one selected driving characteristic to be improved in the driving tournament is to reduce hard cornering events, and the at least one processor is further programmed to:
    determine, based at least in part upon the current vehicle telematics data and the current mobile device usage data, an amount of time each user went without hard cornering events over the predetermined time period;
    store, in the at least one memory device, the amount of time each user went without hard cornering events;
    compare the amount of time each user went without hard cornering events; and
    determine the winner of the driving tournament to be the user with a longest amount of time without hard cornering events over the predetermined time period.

7. The computer system of claim 1, wherein the at least one selected driving characteristic to be improved in the driving tournament is to reduce a length of time in which mobile devices are used while driving, and the at least one processor is further programmed to:
    determine, based at least in part upon the current vehicle telematics data and the current mobile device usage data, an amount of time that each user used a mobile device while driving;
    store, in the at least one memory device, the amount of time that each user used the mobile device while driving;
    compare the amount of time that each user used the mobile device while driving; and
    determine the winner of the driving tournament to be the user with a shortest amount of time in which the user used the mobile device while driving.

8. The computer system of claim 1, wherein the driving tournament includes one of a round robin tournament, a single elimination tournament, or a double elimination tournament.

9. A method for creating driving tournaments for users, the method comprising:
    receiving, by a computing device, user data associated with a plurality of users, the user data including one or more of historical vehicle telematics data, historical mobile device usage data, demographic data, and location data;
    generating, by the computing device, a driving profile associated with each user of the plurality of users based at least in part upon the user data, the driving profile associated with each user including one or more driving characteristics;
    classifying, by the computing device, one or more driving profiles associated with one or more users into a group based at least in part upon location and first driving characteristics of the one or more driving characteristics in the one or more driving profiles;
    matching, by the computing device, the one or more users by matching the one or more driving profiles in the group based at least in part upon second driving characteristics of the one or more driving characteristics in the one or more driving profiles, wherein a match occurs when the second driving characteristics of the one or more driving characteristics in the one or more driving profiles are similar;
    creating, by the computing device, a driving tournament for the matched one or more users, the driving tournament being directed to improving at least one selected driving characteristic of the matched one or more users and spans a predetermined time period;
    receiving, by the computing device, current vehicle telematics data and current mobile device usage data associated with the matched one or more users, the current mobile device usage data indicating usage of respective mobile devices by the matched one or more users; and
    determining, by the computer device, a winner of the driving tournament after the predetermined time period has ended based at least in part upon the current vehicle telematics data and current mobile device usage data, the winner being a user that has most improved the at least one selected driving characteristic.

10. The method of claim 9, further comprising:
    providing, by the computing device, a reward to the winner of the driving tournament, the reward being at least one of an insurance premium discount, an insurance premium deduction, and an insurance premium credit.

11. The method of claim 9, further comprising:
    receiving, by the computing device, a predetermined tournament group from a user included in the predetermined tournament group, the predetermined tournament group including a group of users that wish to compete in the driving tournament together; and
    creating, by the computing device, the driving tournament for the predetermined tournament group.

12. The method of claim 9, wherein generating the driving profile associated with each user includes:
    determining, based at least in part upon the user data, the one or more driving characteristics associated with each user, the one or more driving characteristics including one or more of: (i) an average amount of hard braking events of each user for a predetermined time period, (ii) an average amount of rapid acceleration events of each user for the predetermined time period, (iii) an average amount of speeding events of each user for the predetermined time period, (iv) an average amount of hard cornering events of each user for the predetermined time period, (v) an average number of miles driven by each user for the predetermined time period, and (vi) an average amount of time each user utilized a mobile device of the user while driving for the predetermined time period.

13. The method of claim 9, wherein the at least one selected driving characteristic to be improved in the driving tournament is to reduce hard braking events, and the method further comprises:
    determining, by the computing device, a number of hard braking events for each user over the predetermined time period based at least in part upon the current vehicle telematics data and the current mobile device usage data;

storing, by the computing device, the number of hard braking events for each user;

comparing, by the computing device, the number of hard braking events for each user; and determining, by the computing device, the winner of the driving tournament to be the user with a fewest number of hard braking events over the predetermined time period.

14. The method of claim 9, wherein the at least one selected driving characteristic to be improved in the driving tournament is to reduce hard cornering events, and the method further comprises:

determining, by the computing device, based at least in part upon the current vehicle telematics data and the mobile device usage data, an amount of time each user went without hard cornering events over the predetermined time period based at least in part upon the current vehicle telematics data and the current mobile device usage data;

storing, by the computing device, the amount of time each user went without hard cornering events;

comparing, by the computing device, the amount of time each user went without hard cornering events; and determining, by the computing device, the winner of the driving tournament to be the user with a longest amount of time without hard cornering events over the predetermined period of time.

15. The method of claim 9, wherein the at least one selected driving characteristic to be improved in the driving tournament is to reduce a length of time in which mobile devices are used while driving, and the method further comprises:

determining, by the computing device, an amount of time that each user used a mobile device while driving based at least in part upon the current vehicle telematics data and the current mobile device usage data;

storing, by the computing device, the amount of time that each user used the mobile device while driving;

comparing, by the computing device, the amount of time that each user used the mobile device while driving; and determining, by the computing device, the winner of the driving tournament to be the user with a shortest amount of time in which the user used the mobile device while driving.

16. A non-transitory computer-readable storage media having computer-executable instructions stored thereon that, when executed by at least one processor, cause the computer-executable instructions to:

receive user data associated with a plurality of users, the user data including one or more of historical vehicle telematics data, historical mobile device usage data, demographic data, and location data;

generate, based at least in part upon the user data, a driving profile associated with each user of the plurality of users, the driving profile associated with each user including one or more driving characteristics;

classify one or more driving profiles associated with one or more users into a group based at least in part upon location and first driving characteristics of the one or more driving characteristics in the one or more driving profiles;

match the one or more users by matching the one or more driving profiles in the group based at least in part upon second driving characteristics of the one or more driving characteristics in the one or more driving profiles, wherein a match occurs when the second driving characteristics of the one or more driving characteristics in the one or more driving profiles are similar;

create a driving tournament for the matched one or more users, the driving tournament being directed to improving at least one selected driving characteristic of the matched one or more users and spans a predetermined time period;

receive current vehicle telematics data and current mobile device usage data associated with the matched one or more users, the current mobile device usage data indicating usage of respective mobile devices by the matched one or more users; and determine, after the predetermined time period has ended, a winner of the driving tournament based at least in part upon the current vehicle telematics data and current mobile device usage data, the winner being a user that has most improved the at least one selected driving characteristic.

17. The non-transitory storage media of claim 16, wherein the computer-executable instructions, when executed by the at least one processor, further cause the computer-executable instructions to:

provide a reward to the winner of the driving tournament, the reward being at least one of an insurance premium discount, an insurance premium deduction, and an insurance premium credit;

receive a predetermined tournament group from a user included in the predetermined tournament group, the predetermined tournament group including a group of users that wish to compete in the driving tournament together; and create the driving tournament for the predetermined tournament group.

18. The non-transitory storage media of claim 16, wherein the at least one selected driving characteristic to be improved in the driving tournament is to reduce hard braking events, and the computer-executable instructions when executed by the at least one processor further cause the computer-executable instructions to:

determine, based at least in part upon the current vehicle telematics data and the current mobile device usage data, a number of hard braking events for each user over the predetermined time period;

store the number of hard braking events for each user;

compare the number of hard braking events for each user; and determine the winner of the driving tournament to be the user with a fewest number of hard braking events over the predetermined time period.

19. The non-transitory storage media of claim 16, wherein the at least one selected driving characteristic to be improved in the driving tournament is to reduce hard cornering events, and the computer-executable instructions when executed by the at least one processor further cause the computer-executable instructions to:

determine, based at least in part upon the current vehicle telematics data and the current mobile device usage data, an amount of time each user went without hard cornering events over the predetermined time period;

store the amount of time each user went without hard cornering events;

compare the amount of time each user went without hard cornering events; and determine the winner of the driving tournament to be the user with a longest amount of time without hard cornering events over the predetermined period of time.

20. The non-transitory storage media of claim 16, wherein the at least one selected driving characteristic to be improved in the driving tournament is to reduce a length of time in which mobile devices are used while driving, and the computer-executable instructions when executed by the at least one processor further cause the computer-executable instructions to:
- determine, based at least in part upon the current vehicle telematics data and the current mobile device usage data, an amount of time that each user used a mobile device while driving;
- store the amount of time that each user used the mobile device while driving;
- compare the amount of time that each user used the mobile device while driving; and
- determine the winner of the driving tournament to be the user with a shortest amount of time in which the user used the mobile device while driving.

\* \* \* \* \*